Dec. 14, 1954  G. J. SOMMA  2,696,859
SCREW DRIVER ATTACHMENT
Filed Dec. 16, 1950

INVENTOR.
GILDO J. SOMMA
BY
Robert E. Burns
ATTORNEY.

2,696,859

SCREW DRIVER ATTACHMENT

Gildo J. Somma, Brooklyn, N. Y.

Application December 16, 1950, Serial No. 201,179

2 Claims. (Cl. 145—67)

The present invention relates to hand tools, and particularly to a tool for use with a screw driver.

It is frequently necessary to drive screws in places where space limitations prevent the use of an ordinary straight screw driver. While various expedients have been heretofore proposed for use in such conditions, none of them has proved entirely satisfactory and practical.

It is an object of the present invention to provide a tool for use with a straight shank screw driver to make it possible for the screw driver to be used in tight places where there is not room for the screw driver to be inserted lengthwise. The tool in accordance with the invention is so constructed that it can be used in an extremely narrow space. Moreover, the tool is readily detachable from the screw driver so that the screw driver can be used either alone in usual manner or with the tool where space limitations prevent the use of an ordinary screw driver.

The objects and advantages of the invention will be more fully understood from the following description of the embodiments shown by way of example in the accompanying drawings in which.

Figure 1:
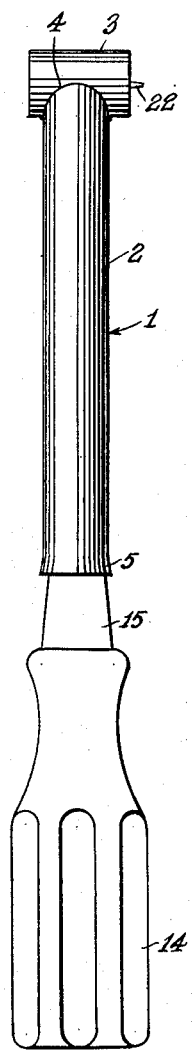
Fig. 1 is a side view of a tool in accordance with the invention.

The tool in accordance with the invention comprises a tubular body portion 1 having a relatively long tubular section 2 and a relatively short tubular section 3 that extends transversely at one end of the longitudinal section 2. The two sections 2 and 3 may be integral with one another or, for convenience of manufacture, may be made up from separate tubular sections joined, for example, by welding or brazing along a line 4. At the end opposite the transverse section 3, the tubular section 2 is open and the edges are preferably curled or flared outwardly. The open end of the tubular section 2 is indicated by the reference numeral 5.

Figure 3:
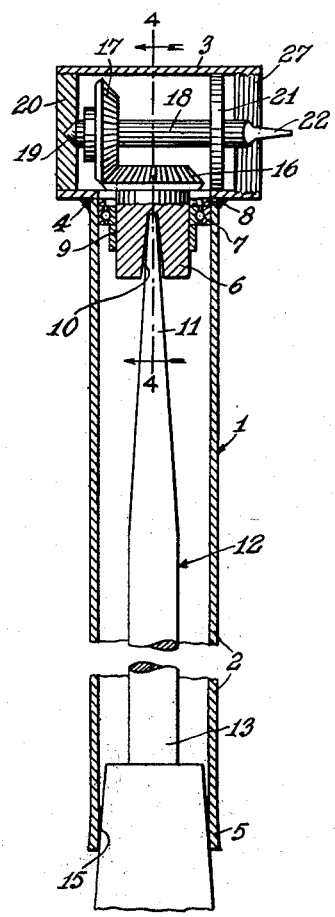
Fig. 3 is a longitudinal section taken approximately on the line 3—3 in Fig. 2.
Figure 4:
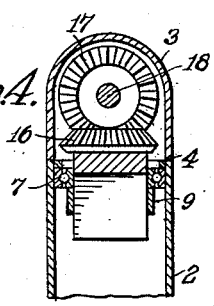
Fig. 4 is a section taken approximately on the line 4—4 in Fig. 3.

A socket 6 is rotatably mounted in the tubular section 2 of the body portion adjacent the transverse section 3 (Fig. 3). As shown in the drawing, the socket 6 is rotatably supported by a ball bearing 7, the inner race of which is held between a shoulder 8 on the socket 6 and a ring 9 that is pressed on the socket member. The outer raceway of the ball bearing 7 is preferably a press-fit in the tubular section 2, although it may be otherwise secured in the tubular section 2 if desired. The ball bearing 7 acts both as a radial and a thrust bearing for the socket 6.

The end of the socket 6 that faces the open end 5 of the tubular section 2 is provided with a slot or recess 10 of a size and shape adapted to receive the bit 11 of a screw driver 12 having a shank portion 13 and a handle 14. Preferably, the shank 13 of the screw driver and the tubular section 2 are of such lengths that a reduced tapered portion 15 of the handle fits without binding into the outwardly flared end portion 5 of the tubular section 2 so as to provide a bearing for holding the screw driver and the tubular section 2 approximately in axial alignment with one another.

At the opposite end of the socket 6, i. e. the end away from the open end 5 of the tubular section 2, there is provided a small bevel gear 16 which meshes with a bevel gear 17 fixedly mounted on a shaft 18 rotatably supported in the transverse tubular section 3 of the body portion 1. As shown in the drawing, the shaft 18 is rotatably supported by a conical bearing 19 in the center of a disc 20 that closes one end of the tubular section 3 and by a washer 21 which is pressed into the opposite end of the tubular section 3 and has a hole through which the shaft 18 extends. The closure member 20 may likewise be pressed into the tubular section 3 or may, if desired, be threaded or otherwise secured. The end of the shaft 18 that projects through the washer 21, i. e. the end opposite to that on which the bevel gear 17 is mounted, is shaped to provide a screw driver bit 22 (Fig. 3). The conical bearing 19 is designed to take the axial thrust that results from pressing the screw driver bit 22 into engagement with a screw and also any thrust that may result from the bevel gear 17.

Figure 2:
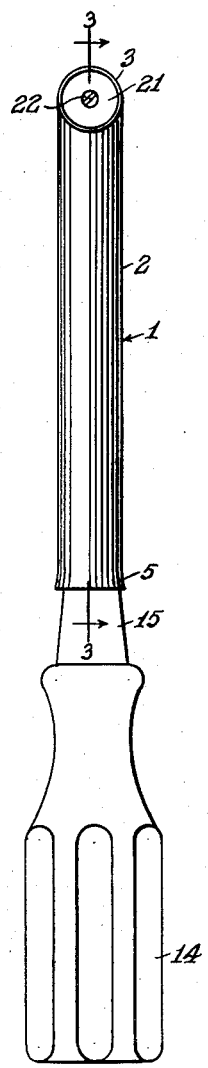
Fig. 2 is a front view.

The tool in accordance with the invention is used by inserting a screw driver 12 into the tool in the position shown in Figs. 1, 2 and 3 and placing the screw driver bit 11 of the tool in the slot of a screw that is to be driven. The operator then turns the handle 14 of the screw driver 12. This acts through the socket 6, bevel gears 16 and 17 and shaft 18 to turn the screw driver bit 22 and thereby drive the screw into the work.

The arrangement of parts in accordance with the invention results in the tool being extremely compact so that it can be inserted into a narrow space. When it is desired to drive screws where there are no space restrictions, the screw driver 12 may be readily removed from the tool and used in ordinary manner. If desired, the bit 11 of the screw driver 12 may be made to fit sufficiently tightly in the recess 10 of the socket 6 so as to keep the screw driver from falling out unintentionally. Alternatively, a suitable spring clip, for example a spring-pressed ball or finger projecting into a groove on the screw driver, may hold the latter in place. In practice, however, it has been found unnecessary to provide retaining means for holding the screw driver in position since the normal tendency in using a screw driver is to press it inwardly toward the work.

In some instances, it is desirable to extend the screw driver bit 22 of the tool or to provide a bit of different size or kind. For this purpose, the tool is provided with a removable supplemental bit 24 which is rotatable in a cap 25. The inner end of the cap 25 is externally threaded, as indicated at 26, and is adapted to screw into an internally threaded portion 27 of the tubular section 3. A shoulder 28 prevents the cap from being screwed in too far and a knurled or fluted portion 29 facilitates turning the cap 25 to screw it in or out of the tubular section 3. The inner end of the bit 24 is provided with a slot or recess 30 adapted to fit over the bit 22. A shoulder 31 on the bit 24 holds it in place and prevents it from slipping out of the cap 25.

Figure 6:
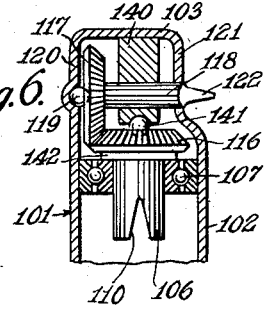
Fig. 6 is a sectional view similar to Fig. 4 but showing a modification.
Figure 5:
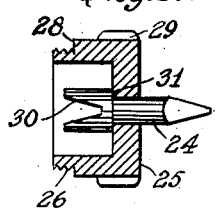
Fig. 5 is an axial section of an attachment for the tool.

In Fig. 6, there is shown an alternative construction of the head portion of the tool. In this figure, corresponding parts are designated by the same reference numerals as in Figs. 1 to 4 with the addition of 100. The tubular body portion 101 comprises a longitudinal section 102 and a transverse section 103. A socket 106 is rotatably supported by a sleeve bearing 107 and is provided with a slot or recess 110 to receive the bit of a screw driver. A gear 116 on the socket 106 meshes with a gear 117 on a shaft 118 which, at one end, is rotatably supported by a single ball 119 fitting into a parti-spherical depression in the end of the shaft 118 and into a depression in the end wall 120 of the tubular section 103. The other end of shaft 118 is rotatably supported by extending through a hole in a wall 121 closing the other end of the tubular section 103. A bearing member 140 provided in the tubular section 103 surrounds the shaft 118 and is provided with a depression adapted to receive a ball 141 which also is received into a depression in the end of the socket 106. The ball 141 thus provides a thrust bearing for the socket 106. A washer 142 is preferably provided between the bevel gear 116 and the sleeve bearing 107. The latter bearing is pressed, or otherwise secured, in the tubular body portion 102.

As the bearing member 140, as shown in the drawing (Fig. 6), provides a bearing for the shaft 118, the wall portion 121 may, if desired, be omitted. With the construction shown in Fig. 6, the shaft 118 can be very short so that the tool can be inserted into an extremely narrow space. The tool is used in the same manner as described above.

While the screw driver bits shown in the drawing are intended for use with the ordinary straight slotted screw head, it will be understood that other types of bits may be used as, for example, the Phillips type for a screw head having crossed slots. The bits of the tool, for example bits 22 and 24, may, if desired, be magnetized to hold the screws in place while they are being started. Likewise, the bit 11 of the screw driver 12, or the socket 6, may be magnetized in order to hold the screw driver in the socket. Still other modifications will be apparent to those skilled in the art, it being understood that the embodiments shown in the drawings and herein particularly described are intended as examples.

What I claim and desire to secure by Letters Patent is:

1. A conversion unit for use in combination with a screw driver having a handle, a straight shank permanently fixed to said handle and a bit at the end of said shank, comprising an elongated tubular body portion, a socket rotatably mounted adjacent one end of said body portion, said socket having a substantially diametrical blind recess to removably receive the extreme end of the bit of the screw driver to provide a driving connection between the socket and a screw driver bit inserted in said recess, a bearing adjacent the opposite end of the tubular body portion to guide said screw driver and cooperating with said socket to hold the shank of the screw driver approximately in line with the axis of the socket, said bearing having an inside diameter greater than the maximum width of said bit so that the screw driver can be inserted into and withdrawn from said unit in an axial direction, the length of the tubular body portion between the socket and the opposite end being approximately equal to the length of the shank of the screw driver so that the handle of the screw driver projects beyond the body portion, a bevel gear associated with, and driven by, the socket, a shaft rotatably supported with its axis perpendicular to the axis of the socket, and a second bevel gear fixed on said shaft and meshing with the first mentioned bevel gear, an end of said shaft being formed as a screw driver bit.

2. A conversion unit for use in combination with a screw driver having a handle, a straight shank permanently fixed to said handle and a bit at the end of said shank, comprising an elongated tubular body portion, a socket rotatably mounted adjacent one end of said body portion, said socket having a blind recess to removably receive the extreme end of the bit of the screw driver to provide a driving connection between the socket and a screw driver bit inserted in said recess, a bearing adjacent the opposite end of the tubular body portion to guide said screw driver and cooperating with said socket to hold the shank of the screw driver approximately in line with the axis of the socket, said bearing having an inside diameter greater than the maximum width of said bit so that the screw driver can be inserted into and withdrawn from said unit in an axial direction, the length of the tubular body portion between the socket and the opposite end being less than the length of the screw driver so that the handle of the screw driver projects beyond said body portion when the bit of the screw driver is in said recess, a bevel gear associated with, and driven by, the socket, a rotatable shaft having its axis perpendicular to the axis of rotation of the socket, a second bevel gear fixed on said shaft and meshing with the first mentioned bevel gear, an end of said shaft being formed as a screw driver bit and means for rotatably supporting said shaft comprising a bearing element which bears against the end of said socket to provide a thrust bearing for the socket and has a bore through which said shaft extends.

References Cited in the file of this patent

UNITED STATES PATENTS

| Number | Name | Date |
|---|---|---|
| 624,999 | Wallin | May 16, 1899 |
| 650,970 | Garner | June 5, 1900 |
| 933,639 | Frink | Sept. 7, 1909 |
| 1,573,464 | Topping | Feb. 16, 1926 |
| 1,645,570 | Anderson | Oct. 18, 1927 |
| 2,339,567 | Granat | Jan. 18, 1944 |
| 2,450,734 | Majeski | Oct. 5, 1948 |

FOREIGN PATENTS

| Number | Country | Date |
|---|---|---|
| 109,155 | Sweden | Nov. 23, 1943 |